1,931,288

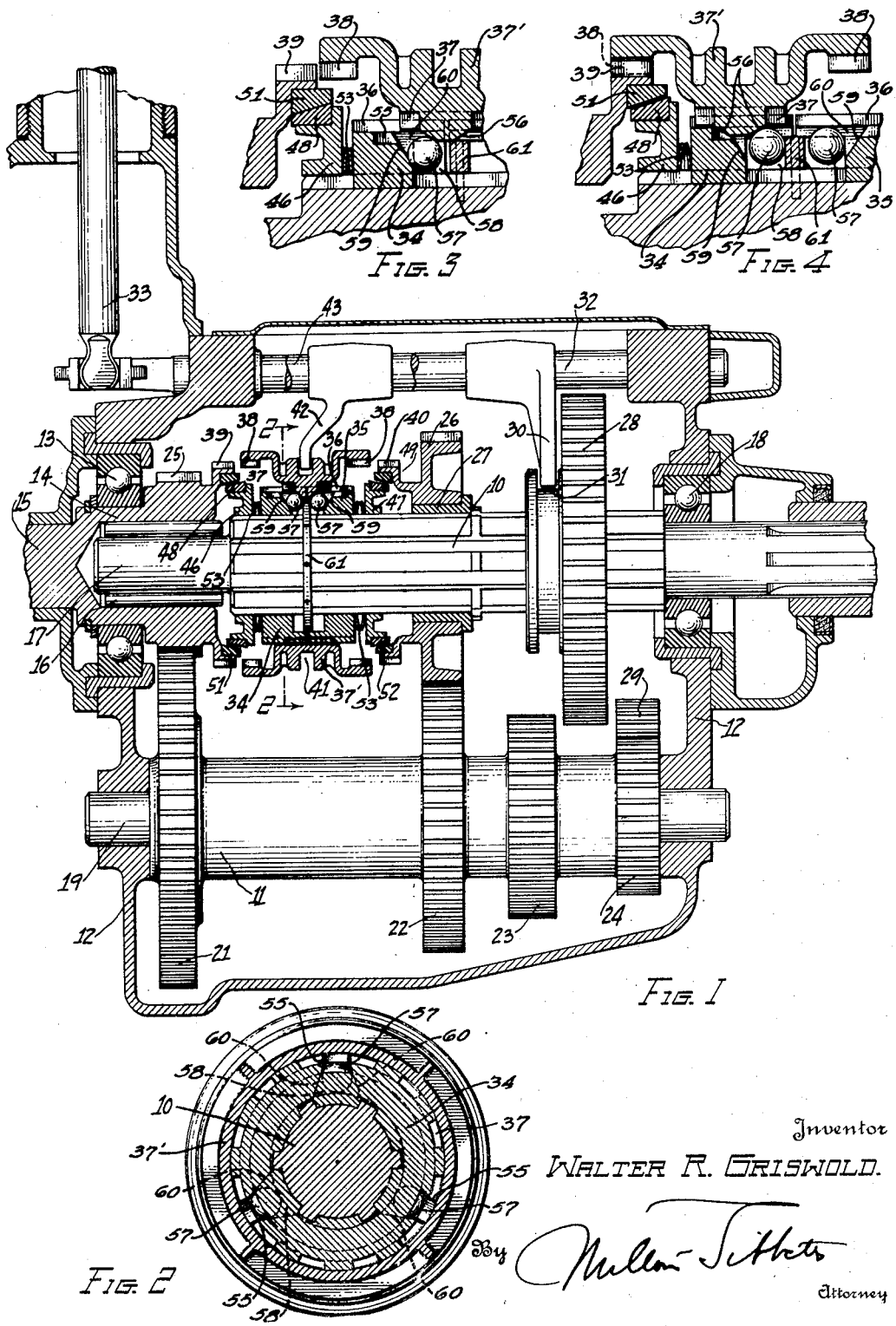
Oct. 17, 1933.  W. R. GRISWOLD  1,931,288
TRANSMISSION MECHANISM
Filed June 19, 1931
Inventor
WALTER R. GRISWOLD.
Attorney Patented Oct. 17, 1933

UNITED STATES PATENT OFFICE 1,931,288

TRANSMISSION MECHANISM

Walter R. Griswold, Detroit, Mich., assignor to Packard Motor Car Company, Detroit, Mich., a corporation of Michigan Application June 19, 1931. Serial No. 545,417

6 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the exigencies of vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been in general cumbersome and complicated, and the operating means have been subjected to excessive wear, and in the more effective devices have been of a nature such as to require release of the synchronizing member immediately upon engagement of the gears or positive driving means. This, in turn, has required a more or less sensitive and complex timing mechanism.

One of the objects of this invention is to provide a motor vehicle transmission with an improved device for synchronizing the gear elements, which shall be simple and effective, and in which the operation of the synchronizing clutches shall be effected through rotating parts not subjected to high relative speeds.

Another object of the invention is to provide a device of the character designated in which friction synchronizing means shall be automatically released just prior to engagement of positive clutch means to permit easy engagement of said clutch means, and in which accurate timing of the application and release of the synchronizing means shall be provided without complication.

Another object of the invention is to provide simple and effective means to limit the engagement pressure of said friction devices, by suitable spring means, to an amount less than the pressure necessary to effect positive clutching.

Another object of the invention is to provide an improved transmitting mechanism to effect the movement of the synchronizing means from the movement of the positive clutch means toward engaging position.

Another object of the invention is to provide a transmission synchronizing device in which movement of the synchronizing clutch shall be derived from shifting movement of the transmission gear mechanism up to a predetermined engagement pressure on said clutch, after which the connecting means shall yield to permit completion of the shifting movement.

Other objects of the invention will appear from the following description taken in connection with the drawing, which forms a part of this specification, and in which:

Fig. 1 is a view, partially in side elevation and partially in longitudinal vertical section through a motor vehicle transmission embodying the present invention;

Fig. 2 is a section taken substantially on the line 2—2 of Fig. 1, and

Figs. 3 and 4 are detail sectional views to a larger scale of part of the transmission shown in Fig. 1, illustrating successive positions of the device.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the fear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may also be driven from the gear 24 through a reverse idler pinion 29 in the well known manner. The sliding of gear 28 on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver in the well known manner.

Thus in the illustrated embodiment of the invention, gear 28 may be moved to mesh with gear 23, to provide a first speed, or connected through pinion 29 to gear 24 to provide a reverse drive. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. This constitutes a hub portion consisting of two pieces 34 and 35, slidably splined on the shaft 10 and having external teeth 36 serving to mesh with teeth 37 on the inside of a positive clutch member or ring 37' slidably mounted thereon. The member 37' is formed at its ends with clutch teeth 38, which may be engaged, by sliding the member axially, either with clutch teeth 39 formed adjacent the pinion 25 on an extension of the shaft portion 14, or with clutch teeth 40 formed on the body of gear 26.

To effect the sliding or shifting movement of the clutch ring, this member is provided with a shifter groove 41, actuated by a shifter fork 42 which is connected to a shifter rod 43, similar to the rod 32 and likewise selectively operated by the gear shift lever 33.

To perform the clutching operation described without shock or clash, this invention provides a synchronizing device adapted to bring the pairs of clutch teeth 38–39 or 38–40 to the same speed before positive engagement. For this purpose, a pair of synchronizing members 46 and 47 are provided, these being slidably splined to the shaft 10 at either end of the hub portion 34—35. The member 46 is provided with a conical brake or flange surface 48, and the member 47 with a similar surface 49 disposed in the opposite direction, these surfaces being preferably formed on removable friction rings. They are respectively adapted to contact cooperating friction rings 51 and 52, the ring 51 being carried by the shaft portion 14, and the ring 52 by the gear 26. These rings may be of any suitable material, such as bronze, and are preferably formed as independent members, pressed or otherwise secured on the shaft end and on the gear body, respectively. The corresponding members 46—48 or 47—49 of each of these friction clutch devices are so spaced as to be engaged upon a relatively small axial movement, and with considerable pressure, so that the relatively rotating members are synchronized by being frictionally connected before intermeshing contact of the positive clutch device.

Between the ends of hub members 34 and 35 and each of the members 46 and 47 is disposed a resilient transmitting member which in the form illustrated comprises a pair of dished spring washers 53 in opposed relation, surrounding the shaft 10. These members 53 operate resiliently to transmit axial pressure from the hubs 34 and 35 to one or the other of the synchronizing members, upon axial movement of the hub in either direction. Thus it will be seen that upon a forward hub movement the synchronizing member 46 is moved axially on the splines of the shaft 10 until its friction ring 48 is brought into contact with the friction ring 51, thus frictionally connecting the members. Continued movement of the hub acts to flatten or compress the spring washers 53, the force of the compressed springs being transmitted to the rings 48 and 51 to increase the friction engagement pressure.

Suitable means is also provided for transmitting axial movement from the positive clutch member 37' to the hubs 34 and 35. For this purpose some of the splines on the inner side of 37' are longer and project inwardly below the level of the teeth 36 through slots 55 formed in the hub members 34 and 35. These projecting splines have axially disposed faces 56 arranged at an angle and adapted to bear on three or more balls 57 mounted in recesses 58 which are provided in the hub members 34 and 35 below the projecting splines on the inner surface of the ring 37'. The recesses 58 are provided with inclined axial faces 59 and are tapered in a radial direction as shown at 60. The radially disposed walls 60 of the recess thus hold the balls in place and the slots 55 permit the teeth 37 on ring member 37' to reach through and act on the balls as will be seen.

The angle which the inclined axial faces 59 makes with the axis of the transmission shaft 10 is greater than that made by the angular faces 56 on the inwardly projecting splines of ring member 37' and between them these faces form a differential wedge which enables the balls 57 under the action of the positive clutch member 37' to transmit an axial movement to the hub members 34 and 35.

The successive steps of the shifting operation are clearly shown in Figs. 3 and 4. In the first of these, ring member 37' has been moved axially and one of its inclined surfaces 56 has begun to act on the ball 57 forcing it to the left and radially inward, against the action of centrifugal force. Axial pressure on the ball has resulted in its forcing the left-hand hub member 34 to the left, thus compressing the spring washers 53 and forcing the frictional rings 48 and 51 together as before mentioned.

When increased axial force on ring member 37' has pushed the balls 57 to the bottom of their recesses, it rides over the balls, thus relieving the pressure between the surfaces 48 and 51 and they are thus disengaged. This relief of pressure is desirable in order that the teeth 38 and 39 will not continue to abut, in case the synchronizing action has brought them to rest in this position. Freeing the friction surfaces will permit slight relative rotation and permit engagement of the clutch teeth 38—39, as shown in Fig. 4.

When engagement has occurred, ring member 37' has ridden over the balls 57, but, because of the presence of the locating ring 61 pinned, as shown, to the shaft 10, movement of 37' back to the neutral position as in Fig. 1 will not permit the balls, under the influence of the inclined face 56, to affect the second speed synchronizing clutch. When shifting out of high gear, the ball is simply pressed inwardly radially and 37' rides over it again to the neutral position.

This operation has been described in connection with the gear ratio change from neutral to high gear and back again, but the change from neutral to second, by which clutch teeth 38 and 40 are engaged, is effected in a similar manner, as will be readily understood.

While I have herein described in some detail a specific embodiment of my invention, which I deem to be new and advantageous and may specifically claim, I do not desire it to be understood that my invention is limited to the exact details of construction, as it will be apparent that changes may be made therein without departing from the spirit or scope of my invention.

Having thus described my invention, what I claim and desire to secure by Letters Patent is:

1. In a motor vehicle transmission having driving and driven members, positive clutch means movable to connect said members, a friction clutch between said members engageable in advance of the positive clutch, a transmitting member between the positive clutch means and the friction clutch means having a ball and wedge connection to the former, and resilient means between the transmitting member and the friction clutch means.

2. In a motor vehicle transmission having a driving member and a driven shaft, positive clutch means rotatable with said shaft and axially slidable to engage the driving member, said clutch means having an inclined wedge face, a supporting member between the clutch means and said shaft and axially slidable on said shaft, said supporting member having a differentially inclined wedge face, ball means between and connecting said faces, a friction clutch means between the driving member and the driven shaft, and a spring transmitting axial movement of the supporting member to the friction clutch means.

3. In a motor vehicle transmission having a driving member and a driven shaft, a hub member slidably splined to said shaft, a friction clutch actuated by said hub member, a clutch sleeve surrounding said hub member and slidably splined thereto, a positive clutch device actuated by said sleeve, inclined cam faces on the sleeve and on the hub member forming a differential wedge, and ball means cooperating with the wedge to transmit a predetermined axial pressure of the sleeve to the hub upon axial movement of the positive clutch device toward engaging position to apply said friction clutch prior to engagement of the positive clutch.

4. In a motor vehicle transmission having a driving member and a driven shaft, a flange on said shaft, a hub member slidably splined to the shaft between the flange and the driving member, said hub member having an inclined end face adjacent the flange, a positive clutch device splined to said hub member and slidable thereon to engage said driving member, said positive clutch device having an inclined face, balls between the face of the flange and the adjacent inclined faces of the positive clutch device and the hub to transmit sliding movement of the clutch device to the hub member, a friction clutch device between the hub member and the adjacent driving member, and a spring between the friction clutch device and the hub member normally urging the same apart.

5. In a transmission mechanism, a driving member, a driven member having an abutment extending therefrom, a hub splined to the driven member and axially movable thereon, an axially movable friction clutch element between the hub and the driving member, said hub having radial recesses in the end thereof adjacent the abutment and providing an angular end face, a positive clutch ring telescoping the hub and splined thereon, said ring being axially movable relative to the hub, faces on the ring extending into the recesses of the hub but at a different angle relative to the end faces thereof, and balls between the adjacent angular faces of the hub and the ring.

6. In a transmission mechanism, a driving member, a driven member having an abutment extending therefrom, a hub splined to the driven member and axially movable thereon, an axially movable friction clutch element between the hub and the driving member, said hub having radial recesses in the end thereof adjacent the abutment and providing an angular end face, a positive clutch ring telescoping the hub and splined thereon, said ring being axially movable relative to the hub, faces on the ring extending into the recesses of the hub but at a different angle relative to the end faces thereof, balls between the adjacent angular faces of the hub and the ring, and spring means between the movable clutch element and the hub tending to axially separate the same.

WALTER R. GRISWOLD.